United States Patent
Jung et al.

(10) Patent No.: US 10,446,892 B2
(45) Date of Patent: Oct. 15, 2019

(54) BATTERY MODULE INCLUDING COOLING FINS OF WHICH MOUNTING DIRECTIONS ARE ALTERNATELY ARRAYED

(71) Applicant: LG Chem, Ltd., Seoul (KR)

(72) Inventors: Jun Hee Jung, Daejeon (KR); Min Sung Kim, Daejeon (KR); Yoon Hee Lee, Daejeon (KR)

(73) Assignee: LG Chem, Ltd., Seoul (KR)

(*) Notice: Subject to any disclaimer, the term of this patent is extended or adjusted under 35 U.S.C. 154(b) by 172 days.

(21) Appl. No.: 15/812,044

(22) Filed: Nov. 14, 2017

(65) Prior Publication Data

US 2018/0151928 A1 May 31, 2018

(30) Foreign Application Priority Data

Nov. 30, 2016 (KR) .................. 10-2016-0161077

(51) Int. Cl.
*H01M 10/655* (2014.01)
*H01M 10/6551* (2014.01)
*H01M 10/613* (2014.01)
*H01M 10/647* (2014.01)
*H01M 10/6557* (2014.01)
*H01M 10/625* (2014.01)
*H01M 2/10* (2006.01)
*H01M 10/6556* (2014.01)

(52) U.S. Cl.
CPC ..... *H01M 10/6551* (2015.04); *H01M 2/1077* (2013.01); *H01M 10/613* (2015.04); *H01M 10/625* (2015.04); *H01M 10/647* (2015.04); *H01M 10/6556* (2015.04); *H01M 10/6557* (2015.04); *H01M 2220/20* (2013.01)

(58) Field of Classification Search
CPC .......... H01M 2/1077; H01M 10/6551; H01M 10/6556
USPC .......................................................... 429/72
See application file for complete search history.

(56) References Cited

U.S. PATENT DOCUMENTS

2012/0040223 A1* 2/2012 Odumodu ........... H01M 2/1077
429/120
2015/0111075 A1* 4/2015 Yum ................... H01M 2/1077
429/83

* cited by examiner

*Primary Examiner* — Bryan D. Ripa
*Assistant Examiner* — James M Erwin
(74) *Attorney, Agent, or Firm* — Morgan, Lewis & Bockius LLP

(57) ABSTRACT

Provided is a battery module including a plurality of cartridges stacked with a battery cell interposed therebetween, wherein each of the cartridges includes: a cooling fin having a plate-shaped structure contacting an outer surface of the battery cell; and a cartridge frame which has a hollow structure and to which an outer peripheral edge of the cooling fin is fixed, wherein, each of guide parts, which is mounted in one side- or the other side-direction of the cartridge frame, is disposed on the outer peripheral edge of the cooling fin so as to fix the cooling fin in position with respect to the cartridge frame, and the cartridges are arranged so that directions in which the guide parts of the cooling fins are mounted with respect to the cartridge frames are opposite to each other in adjacent cartridges.

14 Claims, 2 Drawing Sheets

BATTERY MODULE INCLUDING COOLING FINS OF WHICH MOUNTING DIRECTIONS ARE ALTERNATELY ARRAYED

CROSS-REFERENCE TO RELATED APPLICATION

This application claims priority to Korean Patent Application No. 10-2016-0161077 filed on Nov. 30, 2016 and all the benefits accruing therefrom under 35 U.S.C. § 119, the contents of which are incorporated by reference in their entirety.

BACKGROUND

The present disclosure relates to a battery module including cooling fins of which mounting directions are alternately arrayed.

Recently, with the increasing of technical development and demands of mobile devices, demands of rechargeable secondary batteries as energy sources are rapidly increasing, and thus more researches on the secondary batteries are being carried out to cope with such diverse demands. Also, the secondary batteries have attracted considerable attention as power sources for electric vehicles (EVs), hybrid electric vehicles (HEVs), and plug-in hybrid electric vehicles (Plug-In HEVs), which have been proposed as solutions to air pollution and the like caused by existing gasoline and diesel vehicles that use fossil fuels.

Therefore, the electric vehicles (EVs) capable of traveling using only a battery and the hybrid electric vehicles (HEVs) using a battery in combination with an existing engine, have been developed, some of which have been commercialized. For the secondary batteries as power sources for EVs and HEVs, nickel metal hydride (Ni-MH) batteries are commonly used. However, recent researches on using lithium secondary batteries having high energy density, high discharge voltage, and output stability are being actively carried out, some of which have reached the commercialization.

When such secondary batteries are used in a device or an apparatus such as a vehicle power source and an electric power storage device, which require high capacity, the secondary batteries are used in the form of a battery module in which a plurality of battery cells are arranged.

FIG. 1 illustrates a schematic view showing a lateral configuration of a battery module in accordance with the related art.

Referring to FIG. 1, a battery module 100 is provided by stacking and arraying cartridges 120 with a battery cell 110 interposed therebetween.

The cartridge 120 includes a cooling fin 122 fixed to a cartridge frame 121. In particular, a guide part 122a formed on an outer peripheral edge of the cooling fin 122 is disposed in one side direction of the cartridge frame 121, and thus the cooling fin 122 is fixed in position.

In this case, there is a swelling phenomenon in which the battery cell 110 interposed between the cartridges 120 becomes inflated due to a gas generated inside thereof, in an abnormal operating condition of the battery module 100.

In the cartridge 120 constituting the battery module 100, however, all of the guide parts 122a of the cooling fins 122 are arrayed in the same mounting direction, so that the battery cell 110 is inflated in a direction of the other side of the cartridge frame 121, in which the guide part 122a of the cooling fin 122 is not supported by the cartridge frame 121, resulting in the swelling phenomenon. Accordingly, the swelling phenomenon is concentrated on the battery module 100 in one lateral direction, so the deformation of the battery module 100 occurs intensively in the one lateral direction.

In addition, the swelling phenomenon, which occurs to be biased to the one lateral direction, accelerates damage that is produced by deformation of the battery module 100 and a stress accumulating due to the deformation. Accordingly, the swelling phenomenon acts as a factor to deteriorate the safety of the battery module 100.

Recently, although additional structures are inserted between the cartridges so as to suppress the deformation of the battery module caused by the swelling phenomenon, this addition of the structures causes the increasing of the size or the weight of the battery module.

Thus, there is great need for technologies that may fundamentally solve the above-described limitations.

SUMMARY

The present disclosure provides solutions for the above-described limitations according to the related art and technical tasks requested from the past.

The inventors of the present disclosure have performed intensive researches and a variety of experiments. As a result, cartridges constituting a battery module are arranged so that directions in which guide parts of cooling fins are mounted with respect to cartridge frames are opposite to each other in adjacent cartridges, which will described below. Therefore, when a swelling phenomenon occurs in a battery cell interposed between the cartridges due to abnormal operation of the battery module, the swelling phenomenons occur in directions opposite to each other in adjacent battery cells, to thereby distribute directions of the swelling occurring in the battery cell. In addition, the deformation and damage of the battery module, which are caused by concentration of the swelling of the battery cell in one lateral direction, may be effectively prevented. Also, the swelling occurring in one battery cell is restricted by the swelling occurring in a battery cell adjacent thereto. Therefore, without the need for including additionally a separate component to prevent the limitations caused by the swelling phenomenon, the swelling phenomenons occurring at respective battery cells may be easily suppressed in conjunction with each other. Finally, the present disclosure is completed by verifying that the battery module may be constituted in a more compact structure.

In accordance with an exemplary embodiment, a battery module includes a plurality of cartridges stacked with a battery cell interposed therebetween, wherein each of the cartridges includes: a cooling fin having a plate-shaped structure contacting an outer surface of the battery cell; and a cartridge frame which has a hollow structure and to which an outer peripheral edge of the cooling fin is fixed, wherein, each of guide parts, which is mounted in one side- or the other side-direction of the cartridge frame, is disposed on the outer peripheral edge of the cooling fin so as to fix the cooling fin in position with respect to the cartridge frame, and the cartridges are arranged so that directions in which the guide parts of the cooling fins are mounted with respect to the cartridge frames are opposite to each other in adjacent cartridges.

Therefore, when a swelling phenomenon occurs in a battery cell interposed between the cartridges due to abnormal operation of the battery module, the swelling phenomenons occur in directions opposite to each other in adjacent battery cells, to thereby distribute directions of the swelling occurring in the battery cell. Accordingly, the deformation and damage of the battery module, which are caused by concentration of the swelling of the battery cell in one lateral direction, may be effectively prevented. In addition, by means of the above-described configuration, the swelling occurring in one battery cell is restricted by the swelling occurring in a battery cell adjacent thereto. Therefore, without the need for including additionally a separate component to prevent the limitations caused by the swelling phenomenon, the swelling phenomenons occurring at respective battery cells may be easily suppressed in conjunction with each other. That is, the battery module may be constituted in a more compact structure.

In one specific example, the guide part of the cooling fin may have a structure protruding outward from the outer peripheral edge of the cooling fin, and a guide groove, on which the guide part is seated, may be disposed in a region of the cartridge frame corresponding to the guide part of the cooling fin.

That is, the cooling fin is mounted on the cartridge frame in a manner in which the guide part is seated on the guide groove provided on the cartridge frame. Thus, a more stable mounting structure may be accomplished to enhance structural stability.

In this case, the guide part of the cooling fin and the guide groove of the cartridge frame may have coupling holes perforated at regions corresponding to each other so that a coupling member is able to be inserted and fixed.

Therefore, a coupling force of the cooling fin with respect to the cartridge frame may increase, and at the same time, the cooling fin and the cartridge frame may be easily separated from and coupled to each other when the cooling fin or the cartridge frame is replaced. As a result, there is no need for simultaneously replacing the cooling fin and the cartridge frame, to thereby reduce costs required to repair the battery module or replace components.

Also, number of the guide parts may be at least two.

Therefore, the cooling fin is mounted on the cartridge frame by means of at least two guide parts, to thereby maintain a more stable mounting state.

In this case, at least two of the guide parts may be disposed at positions facing each other in the outer peripheral edge of the cooling fin.

Therefore, when the swelling of the battery cell occurs, stresses applied to the guide part may be effectively distributed to enhance the structural stability.

In one specific example, the guide parts of one cooling fin may have the same mounting direction with respect to one cartridge frame.

That is, although the cartridges are arranged so that directions in which the guide parts of the cooling fins are mounted with respect to the cartridge frames are opposite to each other in adjacent cartridges, the guide parts in the one cooling fin are provided in the same direction with respect to the one cartridge frame. Therefore, even when a stress is transferred due to a swelling phenomenon occurring in a battery cell of an adjacent cartridge in which the cooling fin is arranged in an opposite direction, the stable mounting state may be maintained in conjunction with each other.

In another specific example, among the guide parts of one cooling fin, the mounting direction of at least one guide part with respect to one cartridge frame is opposite to those mounting directions of the remaining guide parts.

Therefore, even if a swelling occurs locally in irregular directions in one battery cell, deformation of the battery module due to the swelling may be stably prevented.

Even in this case, the cartridges may be arranged so that directions in which the guide parts of the cooling fins are mounted with respect to the cartridge frames are opposite to each other in adjacent cartridges.

In addition, the cartridges may be arranged so that the guide parts of the cooling fins of the cartridges disposed in the outermost region are mounted in directions from the inside toward the outside of the cartridge frame.

Therefore, since the cooling fin located in the outermost region is further stably supported by a cartridge frame including a side part, deformation or damage of the battery module, which occurs due to the swelling of the battery cell located inside, may further easily prevented.

Also, the cooling fin may include: a fin main body having a plate-shaped structure; and a refrigerant conduit which is disposed along an outer peripheral edge of the fin main body, and has, at both ends thereof, a refrigerant inlet and a refrigerant outlet through which a refrigerant is introduced and discharged.

Therefore, the fin main body contacting an outer surface of the battery cell may easily transfer heat, which generates in the battery cell, to a refrigerant that flows through the refrigerant conduit.

In this case, at least a portion of an outer peripheral edge region of the fin main body may extend outward, and the extended outer peripheral edge region of the fin main body may wrap an outer surface of the refrigerant conduit to fix the refrigerant conduit.

That is, the refrigerant conduit may be disposed along the outer peripheral edge of the fin main body in a manner in which the refrigerant conduit is wrapped by the extended outer peripheral edge. As a result, there is no need for a welding process to install the refrigerant conduit, to thereby minimize scattering materials generated during the welding process and a product defect caused by the scattering materials.

Here, a guide part may be provided by extending, to the outside of the refrigerant conduit, at least a portion of the extended outer peripheral edge region of the fin main body which wraps the outer surface of the refrigerant conduit.

That is, the guide part provided on the outer peripheral edge of the cooling fin may be formed of at least a portion of the extended outer peripheral edge region of the fin main body. Therefore, the guide part is provided integrally with the fin main body to exhibit a more stable coupling force, thereby enhancing structural stability.

In another specific example, the refrigerant conduit may be coupled to the outer peripheral edge of the fin main body by means of welding.

Therefore, a coupling region of the refrigerant conduit with respect to the fin main body may be appropriately selected depending on a factor such as a structure of the refrigerant conduit or a shape of the battery module.

In this case, a guide part protruding outward may be coupled to a portion of the refrigerant conduit.

Therefore, the guide part may be provided on an appropriate position depending on various conditions such as a structure of the cartridge frame.

In one specific example, a frame coupling part may be provided on the outer peripheral edge of the cartridge frame to couple the neighboring cartridge frames to each other, the frame coupling part being positioned in a region where the neighboring cartridge frames correspond to each other.

Therefore, in spite of the swelling of the battery cell, each of the cartridges is coupled to an adjacent cartridge to stably maintain an arrangement state. At the same time, the deformation and damage of the battery module may be effectively prevented.

Since other configurations of the battery module except for the above-described configurations and structures are well known in the art, their detailed descriptions will be omitted in this disclosure.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Hereinafter, although the present disclosure is further described with reference to the drawings in accordance with exemplary embodiments, the scope of the present disclosure is not limited thereto.

Figure 1:
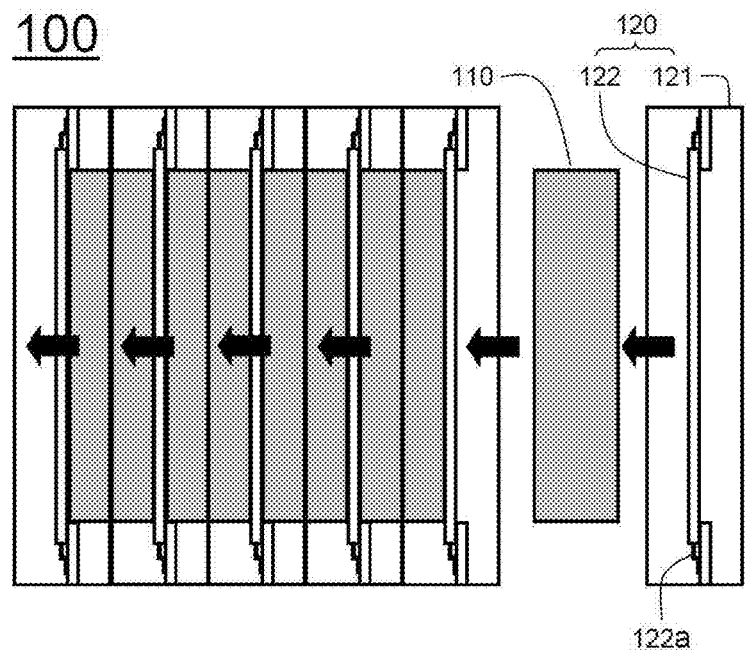
FIG. 1 is a schematic view illustrating a lateral configuration of a battery module in accordance with the related art.
Figure 2:
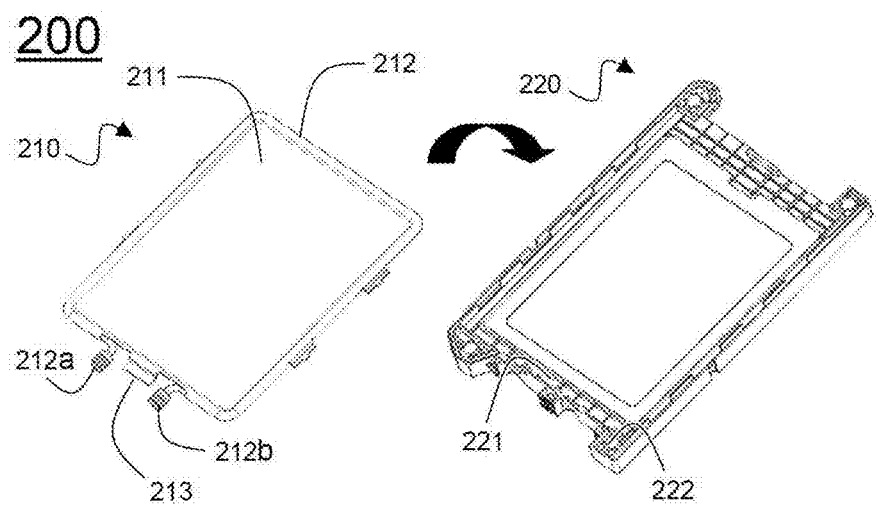
FIG. 2 is a schematic view illustrating a configuration of a cartridge constituting a battery module in accordance with an exemplary embodiment.

FIG. 2 shows a schematic view illustrating a configuration of a cartridge constituting a battery module in accordance with an exemplary embodiment.

Referring to FIG. 2, a cartridge 200 includes a cooling fin 210 and a cartridge frame 220.

The cooling fin 210 includes a fin main body 211 having a plate-shaped structure so as to contact an outer surface of a battery cell and a refrigerant conduit 212 disposed along an outer peripheral edge of the fin main body 211.

The refrigerant conduit 212 has both ends which are disposed on a lower end of the outer peripheral edge of the fin main body 211 and to which a refrigerant inlet 212a and a refrigerant outlet 212b are provided, through which a refrigerant is introduced and discharged.

The fin main body 211 has a structure in which an outer peripheral edge region thereof wraps an outer surface of the refrigerant conduit 212 in a state of extending outward, to thereby fix the refrigerant conduit 212.

In the extended outer peripheral edge region of the fin main body 211 to wrap the outer surface of the refrigerant conduit 212, a central region of the lower end of the outer peripheral edge and portions of both sides of the outer peripheral edge further extend outward from the refrigerant conduit 212 to form a guide part 213.

The cartridge frame 220 has a hollow structure, and the outer peripheral edge of the cooling fin 210 is fixed thereto. When the guide part 213 of the cooling fin 210 is disposed in one side direction, a guide groove 221 to which the guide part 213 is seated is disposed at a region corresponding to the guide part 213.

The cartridge frame 220 includes a frame coupling part 222 which is provided on an outer peripheral edge corner thereof and to which an adjacent cartridge frame 220 is coupled.

Figure 3:
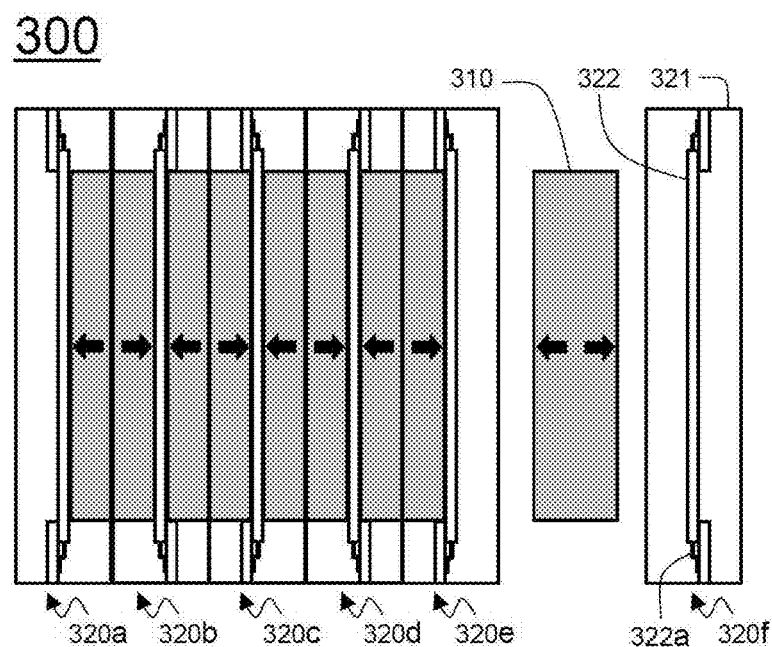
FIG. 3 is a schematic view illustrating a battery module in accordance with an exemplary embodiment.

FIG. 3 shows a schematic view illustrating a battery module in accordance with an exemplary embodiment.

Referring to FIG. 3, a battery module 300 includes six cartridges 320a, 320b, 320c, 320d, 320e, and 320f stacked with battery cells 310 interposed therebetween.

Each of the cartridges 320a, 320b, 320c, 320d, 320e, and 320f includes a cooling fin 322 that has a plate-shaped structure contacting an outer surface of the battery cell 310 and a cartridge frame 321 which has a hollow structure and to which an outer peripheral edge of the cooling fin 322 is fixed.

In the outer peripheral edge of the cooling fin 322, there is a guide part 322a which is mounted to the cartridge frame 321 in one side direction. Each of the cartridges 320a, 320b, 320c, 320d, 320e, and 320f of the battery module 300 is arranged so that directions in which the guide parts 322a of the cooling fins 322 are mounted with respect to the cartridge frame 321 are opposite to each other in the adjacent cartridges 320a, 320b, 320c, 320d, 320e, and 320f.

Therefore, a stress generated due to swelling of the battery cell 310 acts in a direction opposite to that of an adjacent battery cell 310, so that the swelling phenomenon therebetween may be effectively suppressed without an additional component.

In addition, the cartridges 320a and 320f disposed in the outermost region include the guide parts 322a that are arranged to be mounted in directions from the inside toward the outside of the cartridge frame 321.

Therefore, when the swelling occurs in the battery cells 310 of the outermost cartridges 320a and 320f, the guide part 322a of the cooling fin 322 is supported by the cartridge frame 321 to effectively prevent the battery module 300 or the outermost cartridges 320a and 320f from being deformed outward.

Figure 4:
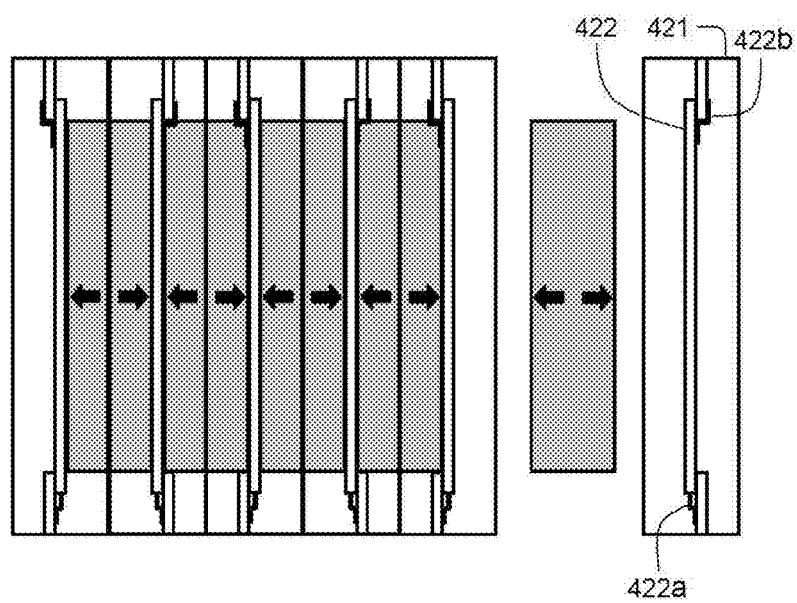
FIG. 4 is a schematic view illustrating a battery module in accordance with another exemplary embodiment.

FIG. 4 shows a schematic view illustrating a battery module in accordance with another exemplary embodiment.

Referring to FIG. 4, in one cooling fin 422, a mounting direction of an upper guide part 422b with respect to a cartridge frame 421 is opposite to a mounting direction of a lower guide part 422a.

Since other structures except for the above-described structures are equal to those in the battery module of FIG. 3, their detailed descriptions will be omitted herein.

As described above, in the battery module in accordance with the present disclosure, the cartridges are arranged so that directions in which the guide parts of the cooling fins are mounted with respect to the cartridge frames are opposite to each other in adjacent cartridges. Therefore, when the swelling phenomenon occurs in a battery cell interposed between the cartridges due to abnormal operation of the battery module, the swelling phenomenons occur in directions opposite to each other in adjacent battery cells, to thereby distribute directions of the swelling occurring in the battery cell. In addition, the deformation and damage of the battery module, which are caused by concentration of the swelling of the battery cell in one lateral direction, may be effectively prevented.

In addition, by means of the above-described configuration, the swelling occurring in one battery cell is restricted by the swelling occurring in a battery cell adjacent thereto. Therefore, without the need for including additionally a separate component to prevent the limitations caused by the swelling phenomenon, the swelling phenomenons occurring at respective battery cells may be easily suppressed in conjunction with each other.

That is, the battery module may be configured in the more compact structure.

Although the present disclosure is described with reference to the drawings in accordance with exemplary embodiments, it will be apparent by those skilled in the art that various applications and modifications can be made thereto, on the basis of the above descriptions, within the scope of the present disclosure.

What is claimed is:

1. A battery module comprising a plurality of cartridges stacked with a battery cell interposed therebetween, the cartridges each comprising:
   a cooling fin having a plate-shaped structure contacting an outer surface of the battery cell and a guide part; and
   a cartridge frame which has a hollow structure and to which an outer peripheral edge of the cooling fin is fixed,
   wherein, each of the guide parts, which is mounted in one side- or the other side-direction of the cartridge frame, is disposed on the outer peripheral edge of the cooling fin so as to fix the cooling fin in position with respect to the cartridge frame, and
   the cartridges are arranged so that directions in which the guide parts of the cooling fins are mounted with respect to the cartridge frames are opposite to each other in adjacent cartridges.

2. The battery module of claim 1, wherein the guide part of the cooling fin has a structure protruding outward from the outer peripheral edge of the cooling fin, and
   a guide groove, on which the guide part is seated, is disposed in a region of the cartridge frame corresponding to the guide part of the cooling fin.

3. The battery module of claim 2, wherein the guide part of the cooling fin and the guide groove of the cartridge frame have coupling holes perforated at regions corresponding to each other so that a coupling member is inserted and fixed.

4. The battery module of claim 1, wherein number of the guide parts is at least two.

5. The battery module of claim 4, wherein at least two of the guide parts are disposed at positions facing each other in the outer peripheral edge of the cooling fin.

6. The battery module of claim 1, wherein the guide parts of one cooling fin have the same mounting direction with respect to one cartridge frame.

7. The battery module of claim 1, wherein, among the guide parts of one cooling fin, the mounting direction of at least one guide part with respect to one cartridge frame is opposite to those mounting directions of the remaining guide parts.

8. The battery module of claim 1, wherein the cartridges are arranged so that the guide parts of the cooling fins of the cartridges disposed in the outermost region are mounted in directions from the inside toward the outside of the cartridge frame.

9. The battery module of claim 1, wherein the cooling fin comprises:
   a fin main body having a plate-shaped structure; and
   a refrigerant conduit which is disposed along an outer peripheral edge of the fin main body, and has, at both ends thereof, a refrigerant inlet and a refrigerant outlet through which a refrigerant is introduced and discharged.

10. The battery module of claim 9, wherein at least a portion of an outer peripheral edge region of the fin main body extends outward, and
    the extended outer peripheral edge region of the fin main body wraps an outer surface of the refrigerant conduit to fix the refrigerant conduit.

11. The battery module of claim 10, wherein at least one of the guide parts is provided by extending, to the outside of the refrigerant conduit, at least a portion of the extended outer peripheral edge region of the fin main body which wraps the outer surface of the refrigerant conduit.

12. The battery module of claim 9, wherein the refrigerant conduit is coupled to the outer peripheral edge of the fin main body by means of welding.

13. The battery module of claim 12, wherein at least one of the guide parts protrudes outward and is coupled to a portion of the refrigerant conduit.

14. The battery module of claim 1, wherein a frame coupling part is provided on the outer peripheral edge of the cartridge frame to couple the neighboring cartridge frames to each other, the frame coupling part being positioned in a region where the neighboring cartridge frames correspond to each other.

* * * * *